Figure 1:
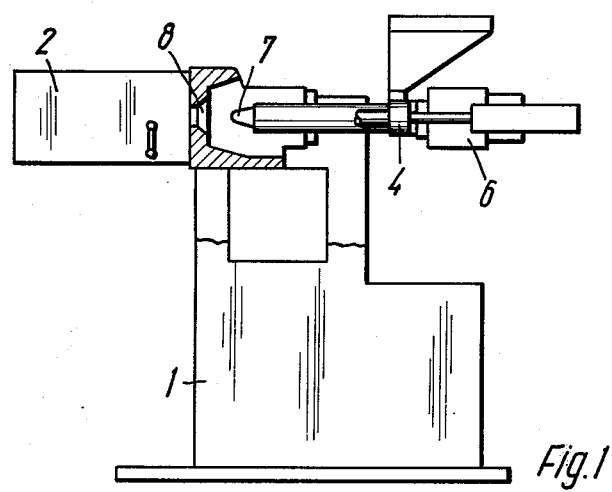

United States Patent [19]

Höfer et al.

[11] 3,936,259

[45] Feb. 3, 1976

[54] INJECTION MOULDING MACHINE

[76] Inventors: Heinz Höfer, Flammersfelder Str. 33, 5461 Schoneberg; Peter Scheid, Hangweg, 5460 Linz, Rhine; Ernst Wilwerscheid, Hoelstr. 26, 5400 Koblenz, Rhine, all of Germany

[22] Filed: Dec. 18, 1973

[21] Appl. No.: 425,877

[30] Foreign Application Priority Data
Jan. 17, 1973 Germany............................ 2302167

[52] U.S. Cl. ............................. 425/242 R; 425/168
[51] Int. Cl.² ....................... B29C 1/00; B29G 3/00
[58] Field of Search........ 425/242 R, 168, 245, 246, 425/247, 244, 248, 192, 190, 135, 130, DIG. 224, DIG. 227; 141/266, 250; 264/328

[56] References Cited
UNITED STATES PATENTS

| | | | |
|---|---|---|---|
| 3,000,240 | 9/1961 | Eckardt | 408/151 |
| 3,728,060 | 4/1973 | Hehl | 425/247 X |

FOREIGN PATENTS OR APPLICATIONS

| | | | |
|---|---|---|---|
| 656,546 | 1963 | Canada | 425/190 |

Primary Examiner—Francis S. Husar
Assistant Examiner—Robert J. Charvat
Attorney, Agent, or Firm—Thomas E. Beall, Jr.

[57] ABSTRACT

The invention relates to an injection moulding machine having an injection unit with a nozzle which is laterally adjustable relatively to a mould opening. The adjustment is provided by one or both of the facilities consisting of:

a. Rotatable eccentric means disposed between the injection unit and the support fixed relatively to the mould, and b. Lockable couplings between two rods, which extend substantially parallel to the axis of the injection unit and on which the injection unit is mounted, and a part fixed relatively to the mould.

21 Claims, 7 Drawing Figures

INJECTION MOULDING MACHINE

The invention relates to an injection moulding machine having an injection unit with a nozzle which is laterally adjustable relatively to a mould unit.

It is known that the nozzle of the injection unit must be accurately aligned with the mould opening, since otherwise a correct injection operation is not possible. The alignment operation is therefore necessary, because unavoidable manufacturing tolerances do not permit exact centering. Hitherto, the centering was carried out during installation, and under the most favourable circumstances once only during the first installation. An extremely time-consuming adjustment operation was therefore involved.

The problem underlying the invention is to provide an injection moulding machine, in which the alignment of the nozzle to the mould centering can be simply carried out after erection.

In accordance with the invention, in an injection moulding machine having an injection unit with a nozzle which is laterally adjustable relatively to a mould opening, the adjustment is provided by (a) rotatable eccentric means disposed between the injection unit and a support fixed relatively to the mould, and/or (b) lockable couplings between two rods, which extend substantially parallel to the axis of the injection unit and on which the injection unit is mounted, and a part fixed relatively to the mould, the couplings allowing the injection unit to pivot perpendicularly to the plane defined by the axes of the bars and to be displaced perpendicularly to the axes of the bars.

With this construction, it is possible to erect the injection moulding machine completely and only then to carry out the alignment of the nozzle with the mould opening. For this purpose, either the injection unit is eccentrically adjusted and locked in the adjusted position, or alternatively or additionally thereto, the injection unit with the bars is pivoted and displaced and finally also locked. These operations can be carried out extremely simply and quickly, even when parts have been replaced and accordingly new tolerances have to be taken up.

The invention is applicable to a machine in which the mould moves away from the injection unit at the end of an injection cycle, or vice versa. In the latter case, two rods, or the two rods, may be fixed to a mould closure unit and extend substantially parallel to the axis of the injection unit, and the injection unit is provided with sleeves which slide on the rods to enable the injection unit to move towards and into engagement with, and away from and out of engagement with, the mould. The sleeves may be double acting cylinders for use in moving the injection unit towards and away from the mould.

The support fixed relatively to the mould may incorporate a housing having a cylindrical concentric internal surface, and the rotatable eccentric means comprises a first annular member rotatable within the internal surface of the housing and having a cylindrical eccentric internal surface, and a second annular member which is rotatable within the internal surface of the first annular member and which has a cylindrical eccentric surface which supports a drive cylinder of the injection unit.

Two eccentrics mounted on inside the other are thus provided. By relative rotation of these eccentrics to each other and also to the housing and to the drive cylinder, the nozzle can be aligned as desired within a circular area. The diameter of this circular area is defined by the sum of the eccentricities.

In one construction, two annular members possess mutually abutting radial flanges which can be clamped between the drive cylinder and the housing after adjustment by rotation of the annular members. After the injection moulding machine has been installed and after the nozzle has been aligned, it is therefore only necessary finally to clamp the drive cylinder to the housing whereby the two annular members are fixed and simultaneously locked against any further adjustment.

The two annular members may have key surfaces projecting by different amounts from the housing to enable the application of keys to rotate the annular members individually. This provides the possibility of adjusting the annular members, i.e. of being able to carry out the alignment of the nozzle in an especially simple manner.

When the adjustable rod coupling facility is provided, each rod coupling may comprise a flange which is bolted to a complementary part by a ring of bolts passing through oversized apertures in the flange, with a peg, the axis of which is perpendicular to that of the rod, interposed between the flange and complementary part.

In order to facilitate the pivotal adjustment about the peg, there may be provided an adjusting screw which screws through the flange and engages the complementary part on one side of the peg. By using this pressure screw on one or both sides of each peg, the desired pivotal angle of the injection unit can be exactly set, and then the fixing bolts of the bolted flanges can be tightened up in the already locked position of the coupling.

Figure 2:
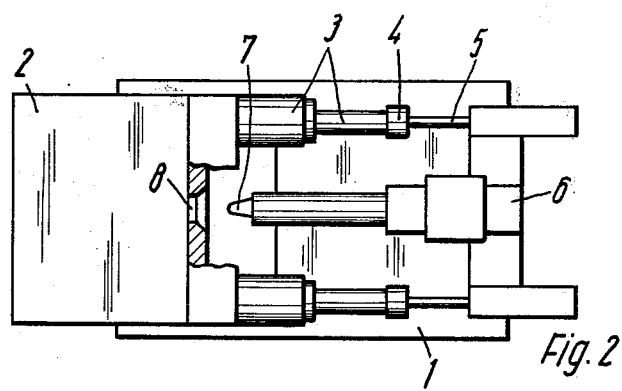
Figure 3:
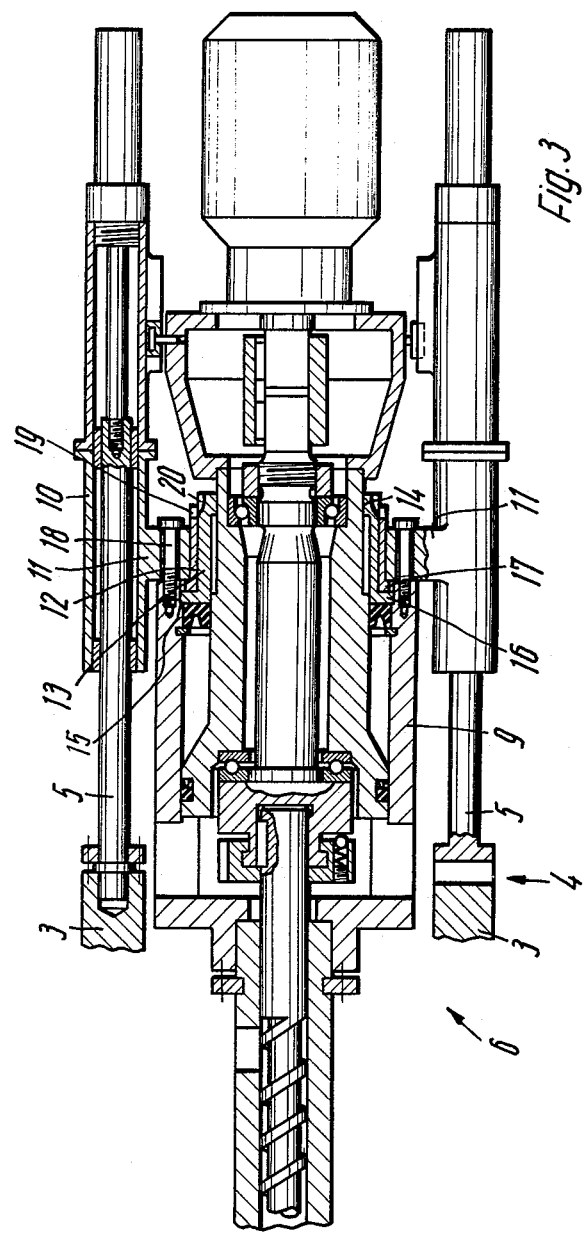
Figure 4:
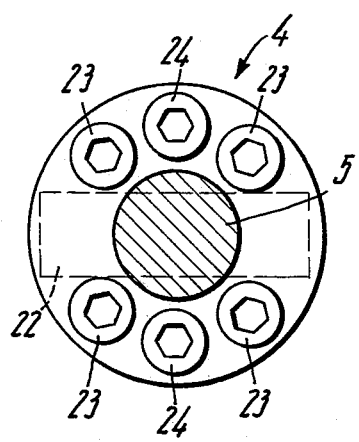
Figure 5:
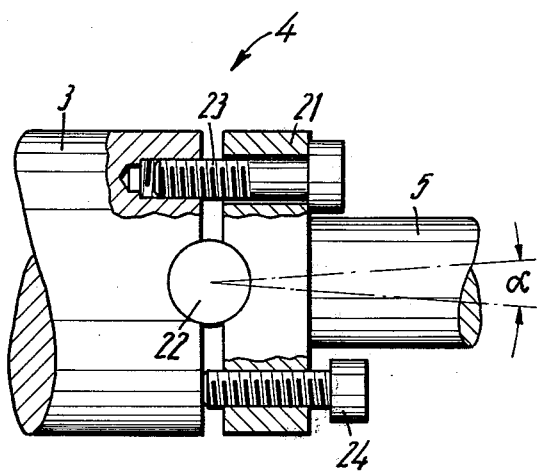

One example of a machine constructed in accordance with the invention is illustrated in the accompanying drawings, in which:

FIG. 1 is a partial cut-away side elevation;
FIG. 2 is a plan;
FIG. 3 is a partly cut-away plan of the injection unit and associated parts of the machine;
FIG. 4 is a view of a rod coupling as seen from the right in FIG. 3;
FIG. 5 is a partly cut-away side view of the FIG. 4 coupling; and,
FIGS. 6 and 7 are sections through the two eccentric annular members in two different relative angular positions.

FIGS. 1 and 2 show how the injection moulding machine possesses a stand 1, on which a mould unit 2 is mounted. At the rear side of the unit 2 are mounted cylinders 3 for opening and closing the mould. Cantilevered bars 5 for supporting an injection unit 6 are attached to the cylinders 3 by means of couplings 4. The injection unit, which can slide on the bars 5, has a nozzle 7 which cooperates with an opening 8 of the mould unit 2.

As seen in FIG. 3, the injection unit 6 possesses a hydraulic drive cylinder 9 with an injection piston and a drive shaft which carries the injection screw and is provided with a rotational drive which is journalled in the piston. The cylinder 9 is fitted with guide sleeves 10, which slide on the cantilevered bars 5, and which act as double acting cylinders to move the injection unit to and fro into and out of cooperation with the mould unit 2 on each injection cycle. The guide sleeves are joined together by means of an annular housing 11, which has a cylindrical internal surface. Between the housing 11 and the cylinder 9 are situated two annular members 12 and 13.

Figure 6:
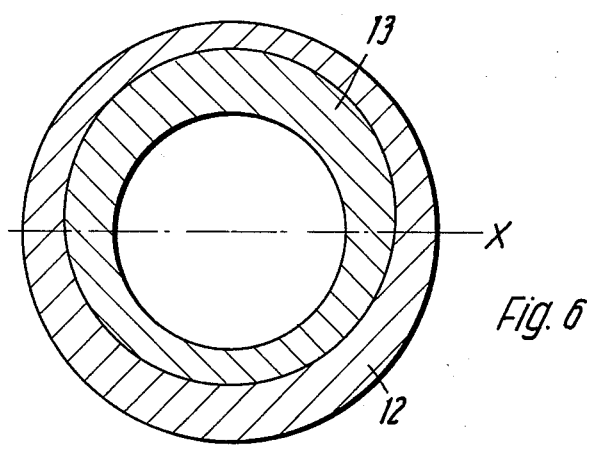
Figure 7:
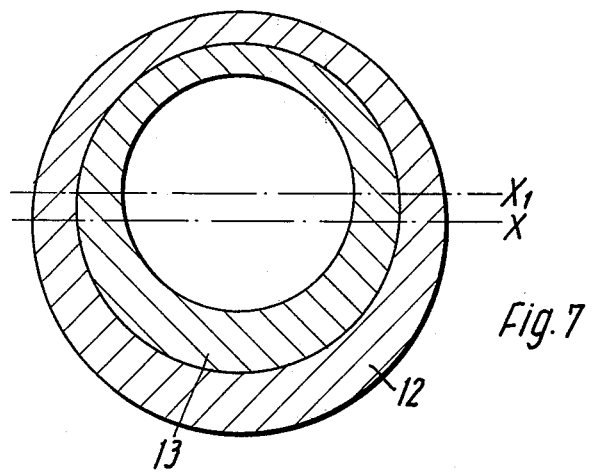

As can be best seen from FIGS. 6 and 7, the annular member 12 possesses a cylindrical external surface, which fits into the cylindrical surface of the housing 11, and an eccentric internal cylindrical surface. This latter surface receives the annular member 13, which in its turn carries a cylindrical, eccentric holder. As shown in FIG. 3, this holder in the present case consists, firstly of a flange providing a cylindrical passage 14 which seals against the piston of the drive cylinder, and secondly of a flange 15, which supports the drive cylinder itself.

FIG. 6 shows the annular members 12 and 13 so adjusted that their eccentricities, which in the present case are of equal values, cancel out each other. In this setting, the nozzle 7 is situated concentrically to the housing 11. FIG. 7 shows a setting, in which the two eccentricities are additive. This enables an offsetting of the nozzle by the value $x-x1$ in one direction to be achieved. By appropriate relative rotation of the two annular members 12 and 13, the nozzle can be adjusted within the field of a circular area having a radius equal to the value $x-x1$.

The cylindrical flange 15 of the annular member 13 constitutes the external surface of a shoulder 16, which bears against a shoulder 17 of the annular member 12. The latter in turn engages the housing 11. The shoulder 16, by contrast, bears against a shoulder of the drive cylinder 9. If the drive cylinder 9 is tightened against the housing 11, for example by screws 18, the two annular members 12 and 13 are simultaneously fixed and locked against any further adjustment.

The annular members 12 and 13 project backwards beyond the housing 11 and carry mutually staggered key faces 19 and 20 or the like, against which, when the screws 18 are loosened, a tool can be set in order to rotate the annular members in a simple manner and thereby to carry out the centering of the nozzle.

In addition to the above-described centering facility, or independently thereof, the machine possesses the coupling 4, between the cantilevered bars 5 and the cylinders 3 of the mould unit. As shown in FIGS. 4 and 5, each bar 5 carries a flange 21, by means of which it can be tightened up to the end surface of the cylinder 3. Both in the flange 21 and also in the opposite end surface of cylinder 3, there is provided a partially cylindrical recess, which receives a pivoting peg 22. The axis of the peg lies in the plane defined by the two bars 5. Fixing bolts 23 serve for tightening up the flange. These bolts pass through the associated holes in the flange 21 of the bar 5 with a clearance; usually the normal maximum tolerances are sufficient for this clearance. The facility therefore exists of pivoting the bars 5 including the injection unit through a desired angle $\alpha$. If the bars lie in a horizontal plane, the desired adjustment of height of the nozzle is effected by this pivoting. Additionally, there is the facility of displacing the injection unit in the axial direction of the pegs 22 by virtue of the bolt hole clearance and thereby of effecting a lateral adjustment of the nozzle. As soon as the nozzle has been correctly centered, the fixing bolts 23 are tightened up.

To facilitate the pivoting of the injection unit, pressure screws 24 are provided in addition to the fixing bolts 23; these pressure screws act between the bolted flanges. In the example illustrated, one pressure screw 24 is situated on each side of each peg 22. By setting these pressure screws, the correct adjustment of the nozzle can be achieved. The fixing bolts 23 can then be tightened up without any special precautions.

The injection nozzle can be lined up with the mould opening by one or both of the facilities described. It is especially advantageous to provide both facilities, since then an especially wide range of adjustment can be encompassed.

We claim:

1. In an injection moulding machine for a mould and having an injection unit with a nozzle, said injection unit having guide sleeves slidably supported on at least two rods lying within a common plane, which rods are normally fixed relative to the mould and extend substantially parallel to the axis of said injection unit, the improvement comprising: lockable coupling means connecting each of said rods to said mould for pivotal adjusting movement of said injection unit relative to said mould above a pivot axis generally perpendicular to said rods and for lateral adjusting displacement of said injection unit relative to said mould parallel to said pivot axis when unlocked, and for rigidly securing said injection unit relative to said mould after adjustment when locked.

2. The injection moulding machine of claim 1, wherein said pivot axis lies within said common plane of said rods.

3. The injection moulding machine of claim 1, wherein there are only two of said rods.

4. The injection moulding machine of claim 1, wherein said coupling means includes axially aligned and partially cylindrical bearing surfaces on the mould end of each of said rods, axially aligned and partially cylindrical bearing surfaces secured to said mould in facing relationship with said rod end bearing surfaces, pivot pin means for engaging said facing bearing surfaces with the facing bearing surfaces forming less than 360° of a cylindrical bearing around said pivot pin means, and means for selectively clamping and unclamping said pin means between said bearing surfaces.

5. The injection moulding machine of claim 4, wherein said pin means consist of one pivot pin for each pair of facing bearing surfaces, and said clamping means includes a plurality of threaded fasteners around each of said pivot pins and threadably securing said rod ends and adjacent mould portions together.

6. The injection moulding machine of claim 5, including at least one threaded bolt threadably extending through one of said rod ends and adjacent mould portion into abutting engagement with the other of said rod end and adjacent mould portion to constitute power means for pivoting said injection unit about said pivot axis when unlocked.

7. The injection moulding machine of claim 5, wherein each of said threaded fasteners extends through oversize apertures along axes perpendicular to said pivot axis, to provide lost motion in the pivot axis direction to constitute the means for permitting the lateral adjusting displacement.

8. In an injection moulding machine for a mould and having an injection unit with a nozzle, said injection unit having guide sleeves slidably supported on at least two rods generally lying within a common plane, which rods are normally fixed relative to the mould and extend substantially parallel to the axis of said injection unit, the improvement comprising: a rotatable eccentric means disposed between said injection unit and said guide sleeves to be rotatable for laterally shifting the axis of said injection unit relative to said rods and sleeves; and means for locking the position of said injection unit relative to said rods and sleeves against further adjustment to rigidly fix such lateral adjustment.

9. The injection moulding machine of claim 8, wherein said rotatable eccentric means includes an annular rigid frame fixedly secured to said sleeves and having an internal cylindrical bearing surface, a first ring having eccentric inner and outer cylindrical bearing surfaces engaging within said annular frame cylindrical bearing surface, a second ring having eccentric inner and outer cylindrical bearing surfaces engaging within said first ring, and an outer cylindrical bearing surface on said injection unit engaging within said second ring.

10. The injection moulding machine of claim 9, wherein said first and second rings have adjacent key surfaces around one axial end periphery to constitute means for engaging a tool to relatively rotate said rings.

11. The injection moulding machine of claim 9, wherein said rotatable eccentric means further includes means locking said first and second rings against rotation with respect to each other and with respect to both said annular frame and said injection moulding unit, and releasing said rings for free relative rotation with respect to each other and with respect to both said annular frame and said injection moulding unit.

12. The injection moulding machine of claim 11, wherein said first ring has an outwardly extending radial flange overlapping and engaging said annular frame, said second ring has an outwardly extending radial flange overlapping and engaging said first ring flange on the side opposite from said annular frame and further overlapping and engaging said injection unit on its side opposite said first ring flange, and said locking means including means for axially clamping said ring flanges between said injection unit and said annular frame.

13. The injection moulding machine of claim 8, including lockable coupling means connecting each of said rods to said mould for pivotal adjusting movement of said injection unit relative to said mould about a pivot axis generally perpendicular to said rods and for lateral adjusting displacement of said injection unit relative to said mould parallel to said pivotal axis when unlocked, and for rigidly securing said injection unit relative to said mould after adjustment when locked.

14. The injection moulding machine of claim 13, wherein said coupling means includes axially aligned and partially cylindrical bearing surfaces on the mould end of each of said rods, axially aligned and partially cylindrical bearing surfaces secured to said mould in facing relationship with said rod end bearing surfaces, pivot pin means for engaging said facing bearing surfaces with the facing bearing surfaces forming less than 360° of a cylindrical bearing around said pivot pin means, and means for selectively clamping and unclamping said pin means between said bearing surfaces.

15. The injection moulding machine of claim 14, wherein said pin means consist of one pivot pin for each pair of facing bearing surfaces, and said clamping means includes a plurality of threaded fasteners around each of said pivot pins and threadably securing said rod ends and adjacent mould portions together.

16. The injection moulding machine of claim 14, wherein each of said threaded fasteners extends through oversize aperatures along axes perpendicular to said pivot axis, to provide lost motion in the pivot axis direction to constitute the means for permitting the lateral adjusting displacement.

17. The injection moulding machine of claim 13, wherein said rotatable eccentric means includes an annular rigid frame fixedly secured to said sleeves and having an internal cylindrical bearing surface, a first ring having eccentric inner and outer cylindrical bearing surfaces engaging within said annular frame cylindrical bearing surface, a second ring having eccentric inner and outer cylindrical bearing surfaces engaging within said first ring, and an outer cylindrical bearing surface on said injection unit engaging within said second ring.

18. The injection moulding machine of claim 17, wherein said coupling means includes axially aligned and partially cylindrical bearing surfaces on the mould end of each of said rods, axially aligned and partially cylindrical bearing surfaces secured to said mould in facing relationship with said rod end bearing surfaces, pivot pin means for engaging said facing bearing surfaces with the facing bearing surfaces forming less than 300° of a cylindrical bearing around said pivot pin means, and means for selectively clamping and unclamping said pin means between said bearing surfaces.

19. The injection moulding machine of claim 17, wherein said rotatable eccentric means further includes means locking said first and second rings against rotation with respect to each other and with respect to both said annular frame and said injection moulding unit, and releasing said rings for free relative rotation with respect to each other and with respect to both said annular frame and said injection moulding unit.

20. The injection moulding machine of claim 19, wherein said first ring has an outwardly extending radial flange overlapping and engaging said annular frame, said second ring has an outwardly extending radial flange overlapping and engaging said first ring flange on the side opposite from said annular frame and further overlapping and engaging said injection unit on its side opposite said first ring flange, and said locking means including means for axially clamping said ring flanges between said injection unit and said annular frame.

21. The injection moulding machine of claim 8, including means positively preventing rotation of said injection unit relative to said sleeves independently of said eccentric means and locking means.

* * * * *